United States Patent [19]

Hellman et al.

[11] Patent Number: 4,633,036

[45] Date of Patent: Dec. 30, 1986

[54] METHOD AND APPARATUS FOR USE IN PUBLIC-KEY DATA ENCRYPTION SYSTEM

[75] Inventors: Martin E. Hellman, 730 Alvarado Ct., Stanford, Calif. 94305; Carl E. Bach, Albany, Calif.

[73] Assignee: Martin E. Hellman, Stanford, Calif.

[21] Appl. No.: 615,634

[22] Filed: May 31, 1984

[51] Int. Cl.⁴ ............................................. H04L 9/00
[52] U.S. Cl. ................................ 178/22.11; 178/22.09
[58] Field of Search ........................... 178/22.11, 22.09

[56] References Cited

U.S. PATENT DOCUMENTS 4,200,770 4/1980 Hellman et al. .................. 178/22.11
4,218,582 8/1980 Hellman ........................... 178/22.11

OTHER PUBLICATIONS

Michael Rabin, "Digitalized Signatures and Public-Key Functions as Intractable as Factorization," MIT Laboratory for Computer Science Technical Report 212, Jan., 1979, pp. 1-16.

Primary Examiner—Salvatore Cangialosi
Assistant Examiner—Aaron J. Lewis

[57] ABSTRACT

In an encryption scheme based on the use of a public key having secret factors p and q, additional requirements on p and q are invoked in order to ensure a high level of security. In particular, it is additionally required that a value p+1 have a large prime factor r and that the value r−1 also have a large prime factor r'.

24 Claims, 8 Drawing Figures

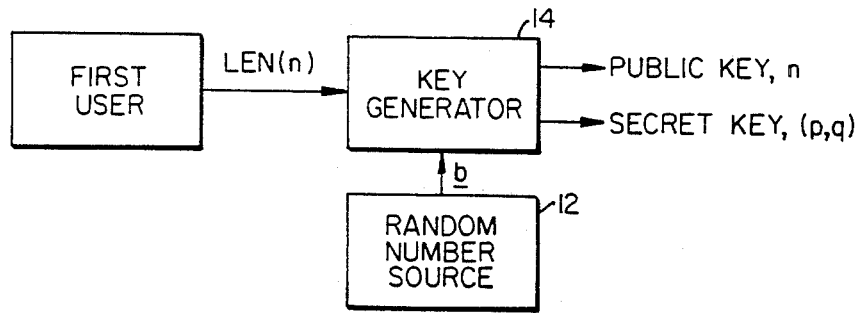
FIG._1.
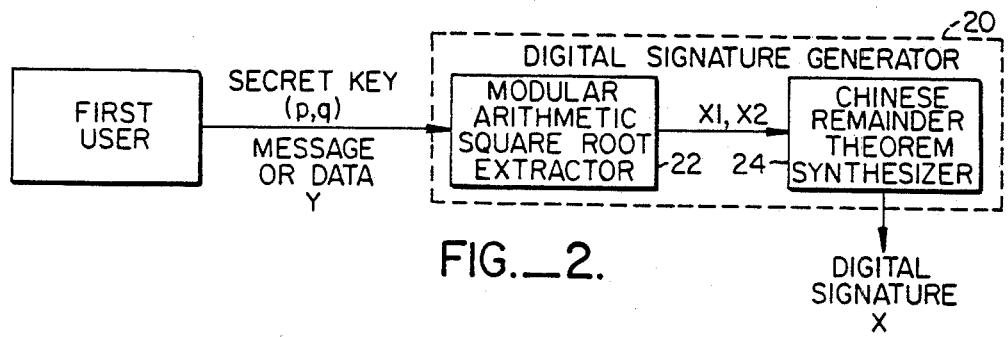
FIG._2.
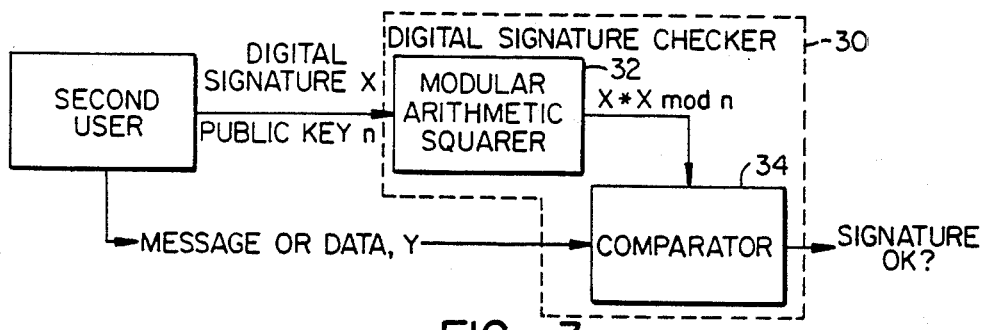
FIG._3.
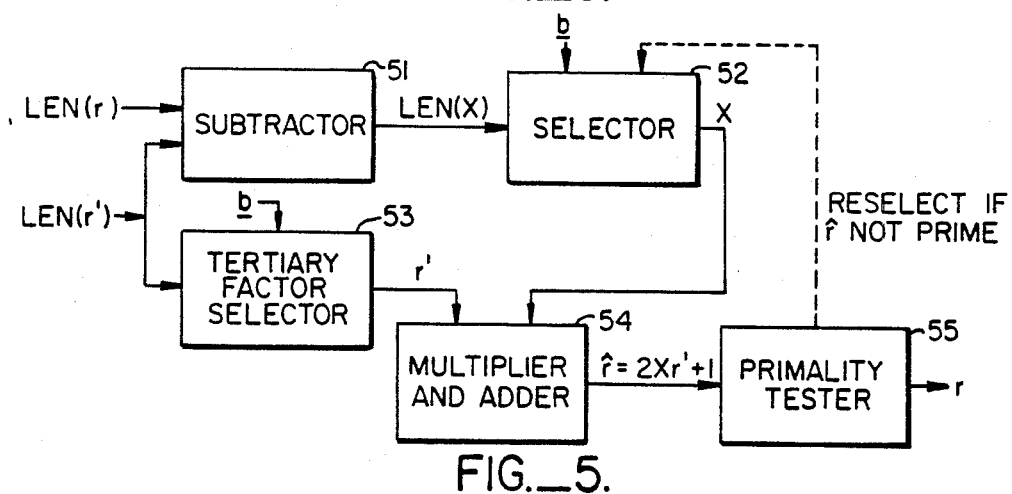
FIG._5.

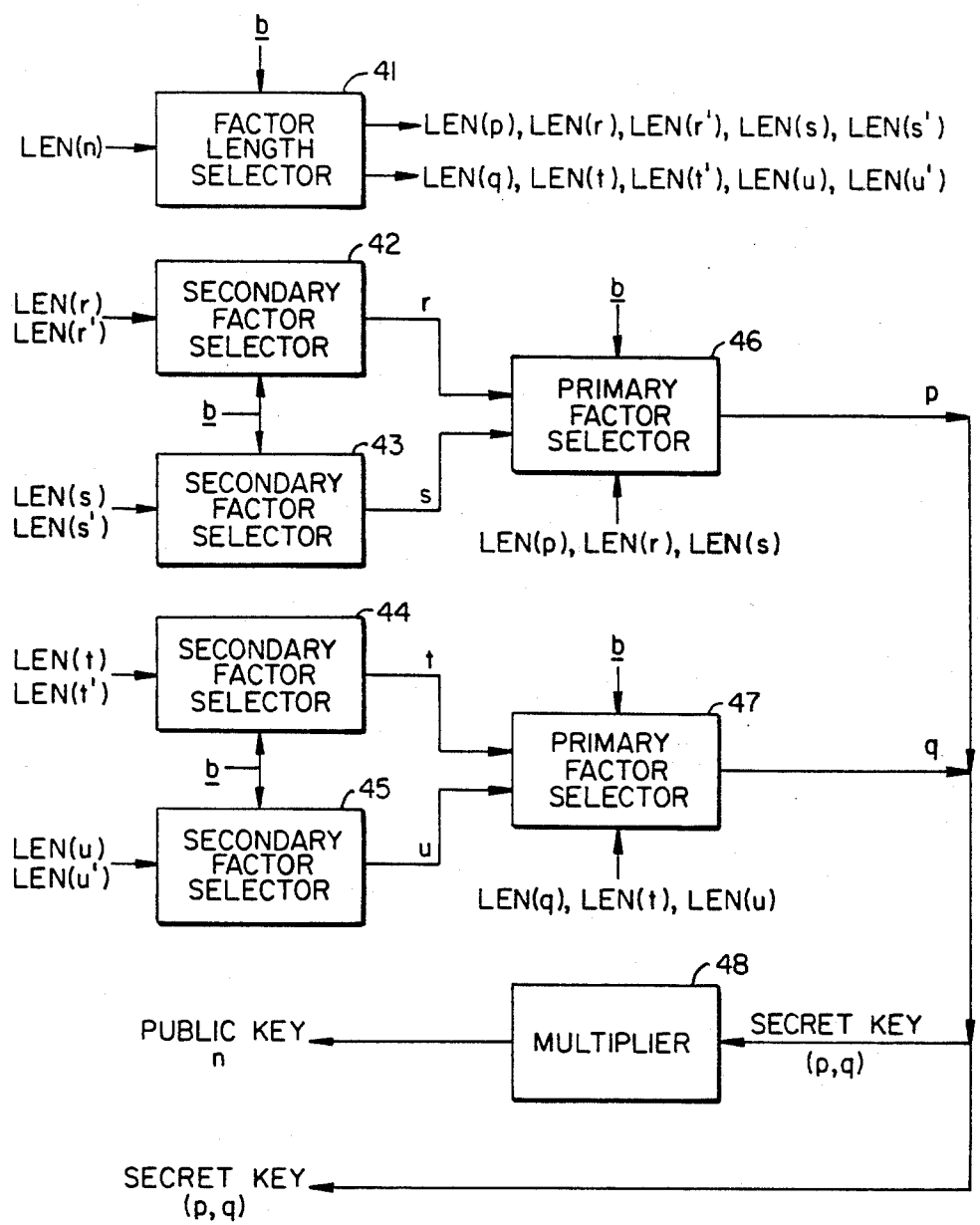
FIG._4.

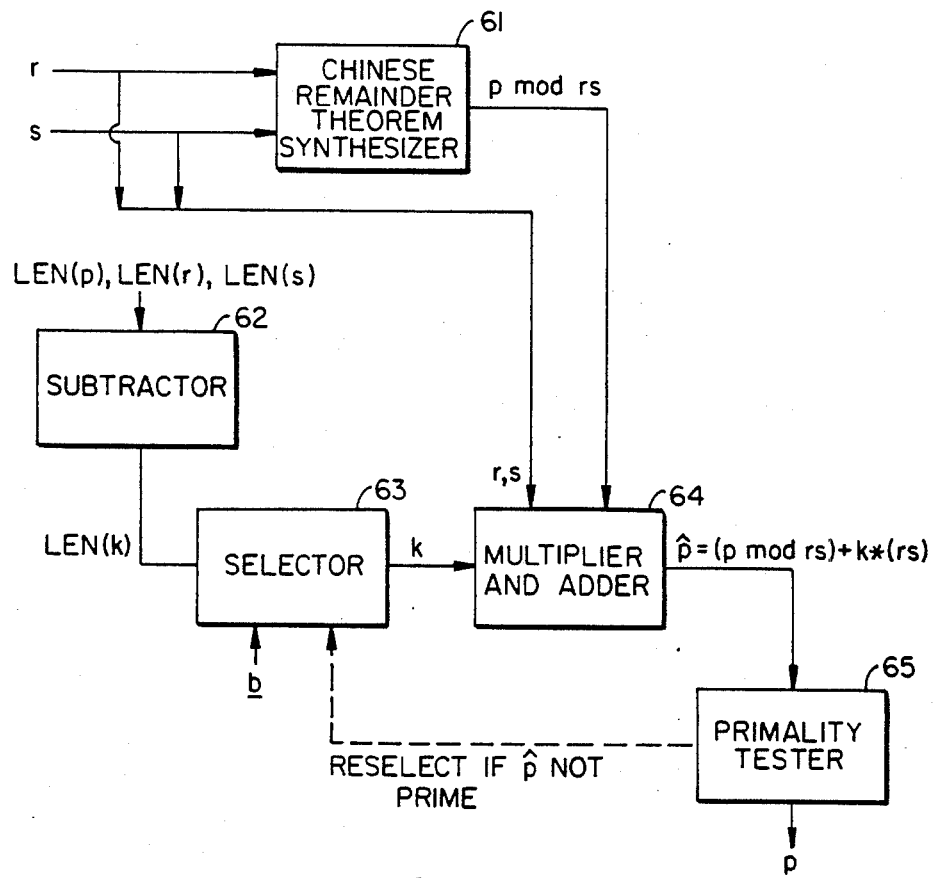
FIG._6.
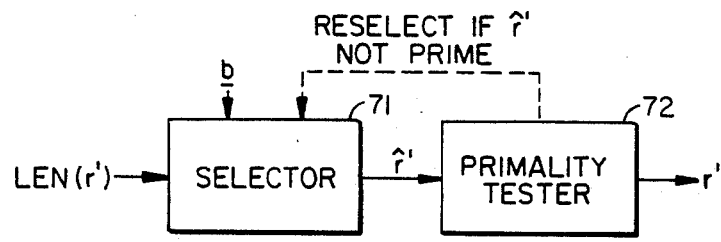
FIG._7.

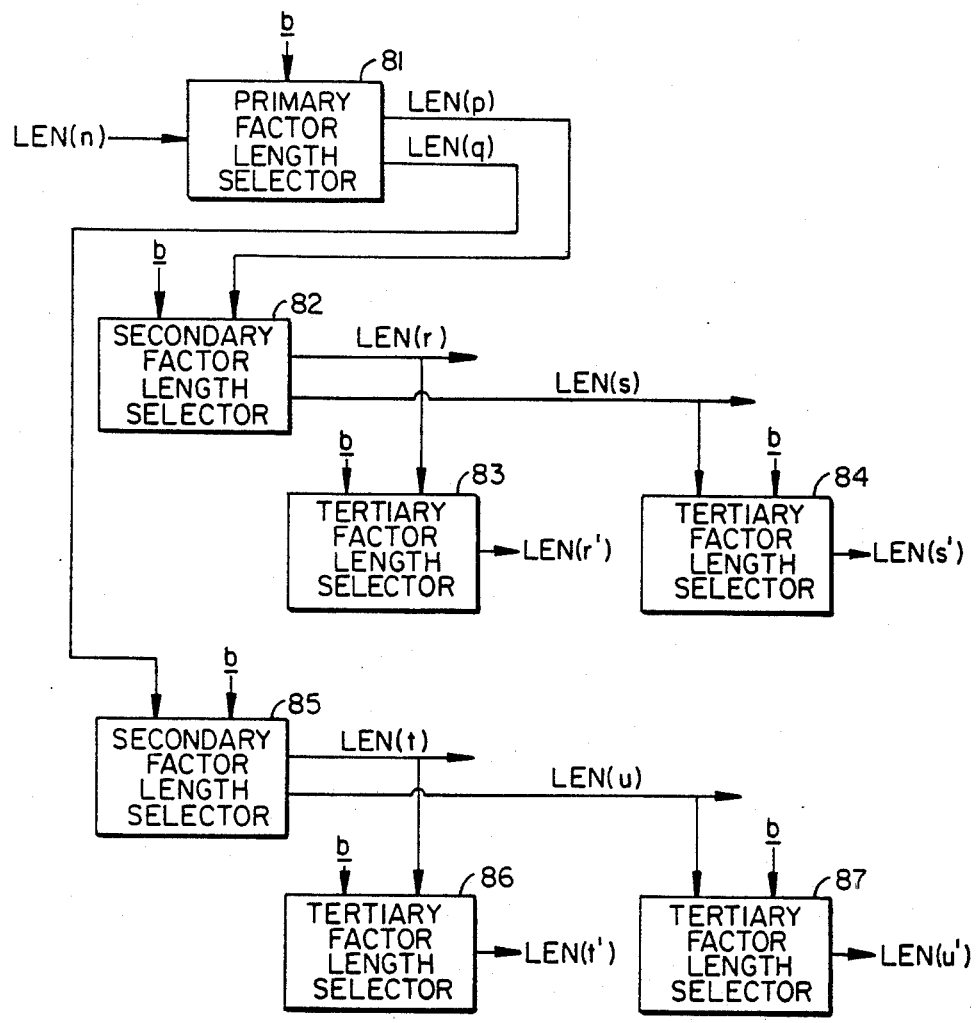
FIG._8.

METHOD AND APPARATUS FOR USE IN PUBLIC-KEY DATA ENCRYPTION SYSTEM

BACKGROUND OF THE INVENTION

1. Field of the Invention

This invention relates to public-key cryptographic systems and in particular to public-key digital signature techniques. The techniques and apparatus are useful for securing computer readable information, such as executable instructions and data. They are also useful for identifying authorized copies of devices containing computer readable information.

The typical purpose of the cryptographic technique is to so disguise a message that it would be difficult if not impossible in practice to encode or decode the message without knowledge of a key. Public-key crypotsystems permit parties to communicate securely with privacy but without prior exchange of keys, and in typical applications such as electronic funds transfer, allowing the creation of digital codes which serve the same function as a handwritten signature for document authentication.

2. Description of the Prior Art

The current model for non-public-key data encryption is the IBM-designed standard adopted by the National Bureau of Standards and generally designated the Data Encryption Standard (DES) cipher.

The need for communicating a secure encryption key over an insecure channel was solved by the invention of public-key concept by the present inventor in conjunction with others at Stanford University. Public-key systems are based on the use of two separate but mathematically related keys, one key for enciphering and the other key for deciphering. The functions chosen for relating the enciphering key to the deciphering key are such that computing the deciphering key from the enciphering key is computationally infeasible. Such functions are popularly referred to as trap-door functions, because they are computationally feasible in only one direction. Reference may be had to Diffie and Hellman, "New Directions in Cryptography," *IEEE Transactions on Information Theory*, November 1976, pages 664–654, and Diffie and Hellman, "Privacy and Authentication: an Introduction to Cryptography," *Proc. IEEE*, Vol. 67, March 1979, pp. 397–427.

There are a number of implementations of the general concept. For example, U.S. Pat. No. 4,218,582 describes a so-called trap-door knapsack to implement the public-key cryptosystem in message communications.

A somewhat different function which is relatively easy to implement is described by Rivest, Shamir and Adleman, "A Method for Obtaining Digital Signatures and Public-Key Crypto Systems" *Communications of the ACM*, February, 1978 pages 120–126. The Rivest et al. (RSA) method suggests the use of two large secret prime numbers whose product is a publicly specified number. According to the RSA method, the message is encrypted by representing it as a number M, raising M to a publicly specified power e, then taking the remainder when the result is divided by the publicly specified product n of the two large secret prime numbers, designated p and q. The result is an encrypted message C. The message is decrypted by raising the encrypted message C to a secret power designated d and then by taking the remainder when the result is divided by the publicly specified product n. The publicly specified power e is chosen to be related to the secret power d according to the following relationship:

$$e*d = 1 \ (\mathrm{mod}(p-1)*(q-1)).$$

The difficulty in breaking the code rests in part in the difficulty in factoring the publicly specified product n. Encryption techniques employing this method are referred to as RSA public-key cryptotechniques.

The RSA cryptosystem prohibits a special case of the publicly specified power e, namely $e=2$. The RSA cryptosystem requires that e be relatively prime to, i.e., have no factor in common with, the values $p-1$ and $q-1$ where p and q are the two large secret prime numbers. Since both p and q are odd numbers because they are prime numbers, $p-1$ and $q-1$ are both divisible by 2 and thus $e=2$ is not allowed according to the RSA cryptosystem.

According to the RSA cryptosystem, additional protection against sophisticated factoring algorithms for p and q may be provided where p and q differ in length by a few digits and $p-1$ contains a large prime factor s, and also where $q-1$ contains a large prime factor u, $s-1$ contains a large prime factor s', $u-1$ contains a large prime factor u', and the greatest common denominator of $p-1$ and $q-1$ is small.

A system somewhat related to the RSA system has been proposed by Michael Rabin, the "Digitalized Signatures and Public-Key Functions as Intractable as Factorization," *MIT Laboratory for Computer Science Technical Report* 212, January 1979. Rabin suggested a different encrypting and decrypting function somewhat related to the RSA method. The Rabin system, however, works with functions which violate the RSA criteria. Reference is made to the work of RSA and Rabin for further information.

SUMMARY OF THE INVENTION

In accordance with the invention, in an ecryption scheme based on the use of a public key having secret primary factors p and q, additional requirements on p and q are invoked in order to ensure a high level of security. In particular, it is additionally required that a value $p+1$ have a large prime secondary factor r in combination with the condition that the value $r-1$ have a large prime tertiary factor r'. Similarly, it is required that the value $q+1$ have a large prime secondary factor t in combination with the condition that the value $t-1$ have a large prime tertiary factor t'. It has been found that breaking the ciphers is as difficult as factoring a large integer n into prime factors p and q, and that prior methods and devices for selecting factors p and q have been inadequate to ensure a verifiably high level of security. The method or apparatus according to the invention may be conventionally called a key generator. In a specific embodiment of the invention the key generator is intended for use with a message of the length of an order of magnitude of ten kilobytes, corresponding to the amount of stored data which is to be protected.

The invention will be better understood by reference to the following detailed description taken in connection with the accompanying drawings.

BRIEF DESCRIPTION OF THE DRAWINGS

FIG. 1 is a block diagram of an exemplary apparatus during generation of a public key and secret key pair.

FIG. 2 is a block diagram of an exemplary apparatus during generation of a digital signature.

FIG. 3 is a block diagram of an exemplary apparatus during checking of a digital signature.

FIG. 4 is a block diagram of an exemplary key generator.

FIG. 5 is a block diagram of an exemplary secondary factor selector.

FIG. 6 is a block diagram of an exemplary primary factor selector.

FIG. 7 is a block diagram of an exemplary tertiary factor selector.

FIG. 8 is a block diagram of an exemplary factor length selector.

DETAILED DESCRIPTION OF SPECIFIC EMBODIMENTS

It is to be understood throughout the discussion of the invention that values and numbers refer to the values and numbers associated with signals in a digital signal processing system. The structure herein described could be implemented in hardware in a specialized circuit by a technician of ordinary skill in this art based on the following description, or it could be implemented in software on a general purpose computing machine. The invention has been successfully simulated for both hardware and software implementations. The following discussion is generic to the various embodiments.

The purpose of a key generator is to produce two (or more) prime numbers p and q which constitute a secret key and their product n=pq which constitutes the public key. The generator described herein is merely exemplary. Other implementations of the principles underlying the generator herein disclosed could function just as well as the embodiments herein disclosed. In a particular application the secret key is used by a digital signature generator to produce a digital signature which may be used for data authentication. The digital signature thus produced is made part of the data so it can be checked by the data utilization device using the public key which is registered in the data utilization device and by use of a digital signature checking means. The preferred encryption scheme is that of Rabin in which the modulo square root operation is the digital signature generation operation and the modulo square operation is the digital signature checking operation.

In arithmetic modulo a prime number, the square root operation is easy to perform so long as the prime number is known. It is paticularly easy to perform if the prime number is of the form $$P = 4k + 3 \quad (1)$$

where k is an integer.

In arithmetic modulo a composite number, the square root operation is difficult to perform unless the prime factorization of the composite number is known. If the factorization is known then the square root operation is easily accomplished by combined use of of the square-root-modulo-a-prime-number operation (using the prime factors of the composite number as the modulus) and the Chinese Remainder Theorem. As is well known, the Chinese Remainder Theorem is a relatively easy operation to perform.

If Y is the message or data to be signed, n is the public key, and (p,q) is the secret key, then the digital signature is $$X = SQRT(Y), \text{modulo } n, \quad (2)$$

where SQRT denotes the square root operation. X can be easily determined from knowledge of the secret key (p,q) as follows:

First compute $$X1 = SQRT(Y), \text{modulo } p \quad (3)$$
$$= Y^{**}[(p+1)/4], \text{modulo } p$$

and $$X2 = SQRT(Y), \text{modulo } q \quad (4)$$
$$= Y^{**}[(q+1)/4], \text{modulo } q$$

where it is assumed p and q are each of the form (1) for different values of k, and ** denotes the exponentiation operation. (As described for example in U.S. Pat. No. 4,200,770 FIGS. 2-6, it is known that the exponentiation operation in modular arithmetic is easy to implement in electronic circuitry and easy to perform.) Then the digital signature X can be computed from X1 and X2 by use of the Chinese Remainder Theorem (see, for example, Knuth, *The Art of Computer Programming, Vol. 2, Seminumerical Algorthms,* Addison-Wesley (1969), pp. 248-250) as $$X = X1^*A + X2^*B, \text{modulo } n \quad (5)$$

where $A = q^{}(p-1)$, modulo n and $B = p^{}(q-1)$, modulo n and * denotes the multiplication operation. Again, the method described in U.S. Pat. No. 4,200,770 can be used to compute A and B easily.

While we describe the operation of the apparatus with Y being the message or data to be signed, it is obvious that X can sign a function, f(Y), of the message or data just as well. That is $X = SQRT[f(Y)]$ modulo n.

While the above described method allows the legitimate signer of the message or data who knows his secret key (p,q) to compute the digital signature X easily, anyone who knows just the public key n cannot easily compute the digital signature. Anyone who knows just the public key n can, however, easily check that X is the digital signature which signs the message or data Y. This is done by squaring X modulo n and checking if Y results.

According to the invention, a key generator is provided for selecting a public key and a secret key, the secret key consisting of two prime numbers p and q, and the public key consisting of the product of these two numbers. The secret key may be used to generate digital signatures for verifying the authenticity of data. More specifically, the key generator is operative to generate a secret key (p,q) which is computationally infeasible to obtain from the public key n by factoring. By computationally infeasible it is meant difficult, where the degree of difficulty is large compared to the value of the information to be protected. Since it has been found that generating a secret key from two randomly generated prime numbers can be subject to statistically-based factoring attacks, the key generator according to the invention guarantees that primary factors p and q will have all the following properties which increase the security of the cryptosystem:

the value p+1 will have a prime secondary factor r which is at least k(r) bits long;

the value p−1 will have a prime secondary factor s which is at least k(s) bits long;

the value r−1 will have a prime tertiary factor r' which is at least k(r') bits long;

the value s−1 will have a prime tertiary factor s' which is at least k(s') bits long;

the value q+1 will have a prime secondary factor t which is at least k(t) bits long;

the value q−1 will have a prime secondary factor u which is at least k(u) bits long;

the value t−1 will have a prime tertiary factor t' which is at least k(t') bits long; and the value u−1 will have a prime tertiary factor u' which is at least k(u') bits long.

Of these eight requirements, the two requirements that r−1 have a large prime tertiary factor r' and that t−1 have a large prime tertiary factor t' have never before been recognized as a significant requirement.

The four requirements that p−1 have a large prime factor s, that s−1 have a large prime factor s', that q−1 have a large prime factor u, and that u−1 have a large prime factor u' have previously been recognized in the art with respect to some public key data encryption systems. The two requirements that p+1 have a large prime factor r and that q+1 have a large prime factor t are known in the art also.

Referring to FIG. 1, there is shown a block diagram of the apparatus during generation of a public key, herein designated n, and a secret key, herein designated (p,q). A first user of the apparatus who is to sign messages or data specifies the length of the public key, LEN(n). This length is selected based on the security level and speed desired. (Larger values of LEN(n) provide greater security but impose slower operation.) A signal representing LEN(n) and signals which represent the random bit outputs, b=(b1, b2, b3, . . . ), of a random number source 12 are input signals to a key generator 14, whose two output signals represent the public key n and the secret key (p,q).

Referring to FIG. 2, there is shown a block diagram of the apparatus during generation of a digital signature. The first user applies input signals representing his secret key (p,q), and his message or data to be signed, herein designated Y, to a digital signature generator 20, which consists of a modular arithmetic square root extractor 22 and a Chinese Remainder Theorem synthesizer 24. The output of digital signature generator 29 is a signal representing the digital signature X, derived from input signals representing p, q, and Y according to equations (2), (3), (4) and (5) above and using, for example, the method and circuitry of U.S. Pat. No. 4,200,770 for producing signals representing exponentials in modular arithmetic.

Referring to FIG. 3, there is shown a block diagram of the apparatus during checking of a digital signature. A second user who has been given the signed message or data, consisting of (Y,X), applies input signals representing the message or data Y, the digital signature X, and the public key n to a digital signature checker 30. The digital signature checker 30 consists of a modular arithmetic squarer 32 and a comparator 34. The signals representing the digital signature X and the public key n are inputs to the modular arithmetic squarer 32 which produces a signal representing X*X mod n as its output signal. This output signal and the message or data Y are applied as input signals to comparator 34. If the signals representing X*X mod n and Y match exactly, then the signature is accepted as valid. If even one bit of the two signals differs, then the signature is rejected as invalid.

Referring to FIG. 4, there is shown a block diagram of an exemplary embodiment of a key generator suitable for choosing values for p and q and thereby for specifying the value n. The key generator 14 comprises a factor length selector 41, four identical secondary factor selectors 42, 43, 44, and 45, two identical primary factor selectors 46 and 47, and a multiplier 48. Signals representing LEN(n) and the random bit outputs b of the random number source 12 are available to all components of the key generator 14, as shown in FIG. 1.

The factor length selector 41 chooses LEN(p) and LEN(q) to balance various requirements. For example, as described in Knuth, *The Art of Computer Programming, Vol. 2, Seminumerical Algorithms,* Addison-Wesley (1969), pp. 342-344, if p and q are very close together, then the public key is easy to factor to obtain the secret key (p,q). It is also clear that having p and q be numerically very far apart makes n easy to factor. In the extreme case, either p or q will be so small that an exhaustive search will be a reasonable technique to develop the factors.

To balance these two conflicting requirements, LEN(p) and LEN(q) are selected to be large enough to guarantee the desired level of security when the best known methods of factoring which depend on p or q being small are employed. In addition the difference LEN(p)−LEN(q) is selected to be large enough to guarantee the desired level of security when the best known methods of factoring which depend on p and q being close together are employed.

If n is 956 bits long, the LEN(p) can be chosen randomly to be between between 360 and 470 bits long. Therefore $LEN(q)=LEN(n)-LEN(p)$ would be distributed randomly between 486 bits and 596 bits in length. This criterion produces values such that p and q are each sufficiently large to foil exhaustive searching or other similar factoring algorithms which depend on p or q being small. It also guarantees that the difference q−p is at least a 486 bit number, which is large enough to foil factoring algorithms which depend on p and q being close together.

Additional requirements are imposed on factor length selector 41. It is known that p+1 and q+1 should have large prime factors r and t, the p−1 and q−1 should have large prime factors s and u, and that s−1 and u−1 should have large prime factors s' and u'. In addition, according to the invention, it has been discovered that r−1 and t−1 should have large prime factors r' and t'.

Because factoring the large numbers p−1, p+1, q−1, q+1, s−1, u−1, r−1 and t−1 is computationally difficult, the key generator 14 according to the invention first generates the desired factors and then generates he large numbers such that the factors thereof are known. Specifically, signals representing random prime numbers r and s of length LEN(r) and LEN(s) are first generated by secondary factor selectors 42 and 43. These signals are then applied as inputs to primary factor selector 46, which generates an output signal representing a random prime number p of length LEN(p) and which is guaranteed to have r as a factor of p+1 and to have s as a factor of p−1.

Similarly, signals representing random prime numbers t and u of lengths LEN(t) and LEN(u) are generated by secondary factor selectors 44 and 45. These signals are then applied as inputs to primary factor selector 47 which generates an output signal representing a random prime number q of length LEN(q) and which is guaranteed to have t as a factor of q+1 and u as a factor of q−1.

The signals representing p and q comprise the secret key output of key generator 14. These signals are also applied as inputs to multiplier 48 to produce the product p q which is the desired public key output n of key generator 14.

Referring to FIG. 5, there is shown a block diagram of an exemplary embodiment of secondary factor selector 42 suitable for choosing a value for r. Because secondary factor selectors 43, 44, and 45 suitable for selecting s, t, and u are identical in operation to secondary factor selector 42, the following description also indicates the operations of secondary factor selectors 43, 44, and 45. A possible value for r, denoted $\hat{r}$ is generated as $2Xr'+1$ to guarantee that r' is a factor of $\hat{r}−1$. The factor of 2 in $2Xr'+1$ is needed to ensure that the value of $\hat{r}$ thus generated will be odd and hence has a chance of being prime.

A signal representing the value of r thus generated is applied as an input signal to primality tester 55. Primality tester 55 can be implemented as described, for example, in Knuth, *The Art of Computer Programming, Vol. 2, Seminumerical Algorithms*, Addison-Wesley (1969), pp. 347–351 or in Solovay and Strassen, "A Fast Monte-Carlo Test for Primality," *SIAM Journal of Computing*, Vol. 6, pp. 84–85, March 1977. If primality tester 55 determines that $\hat{r}$ is prime then this value is taken as the output r of the secondary factor generator 42. Because approximately every $LEN(r)*\ln(2)/2=0.35*LEN(r)$ odd numbers of length LEN(r) are prime, the number of $\hat{r}$ values tested will be reasonable (e.g., 35 to 350) even if LEN(r) is in the 100 to 1000 bit range.

Referring to FIG. 6, there is shown a block diagram of an exemplary embodiment of primary factor selector 46, suitable for choosing a value for p. Because primary factor selector 47, suitable for choosing a value for q is identical in operation to primary factor selector 46, the explanation of the operation of the primary factor selector 46 also explains operation of primary factor selector 47. Signals representing the values of r and s generated by secondary factor selectors 42 and 43 are applied as input signals to Chinese Remainder Theorem synthesizer 61, which has as its output signal a representation of the value p mod rs. Because r is to be a factor of p+1 and s is to be a factor of p−1, it follows that p+1=0 mod r and p−1=0 mod s, or equivalently $$p = -1 \bmod r \tag{6}$$

and $$p = +1 \bmod s \tag{7}$$

Knowing the value of p mod r and the value of p mod s, the Chinese Remainder Theorem allows calculation of the value of p mod rs via the relation $$p \bmod rs = (p \bmod r)*C + (p \bmod s)*D \tag{8}$$

where $$C = s^{**}(r-1) \bmod rs \tag{8a}$$

and $$D = r^{**}(s-1) \bmod rs. \tag{8b}$$

See for example, Knuth, *The Art of Computer Programming, Vol. 2, Seminumerical Algorithms*, Addison-Wesley (1969), pp. 248–250. The modular exponentiations can be accomplished using the methods and circuitry described in U.S. Pat. No. 4,200,770.

The signal representing the value p mod rs is applied as one of four input signals to multiplier and adder 64. The other three input signals are r, s and a random number k of length LEN(k) such that a possible value for $p=(p \bmod rs)+k*(rs)$ will be of length LEN(p). This is accomplished by using subtractor 62 to set LEN(k) equal to LEN(p)−LEN(r)−LEN(s). Then $k*(rs)$ will be of length $LEN(k)+LEN(r)+LEN(s)=LEN(p)$. In addition, $\hat{p}=(p \bmod rs)+k*(rs)$ will be of the same length as $k*(rs)$ since that component will be much larger than (p mod rs). A signal representing LEN(k) is applied as input to selector 63 which selects LEN(k) bits from the random bit stream b.

A signal representing the value of p thus generated is applied as an input signal to primality tester 65. If primality tester 65 determines that p is prime, then this value is taken as the output p of the primary factor generator 46. If primality tester 65 determines that the input signal $\hat{p}$ is not prime, then a signal is applied to selector 63 to select a new candidate value $\hat{p}$. The new candidate value $\hat{p}$ causes primality factor selector 63 to generate new, random values k, each of length LEN(k), which are used to produce new values $\hat{p}$ which are tested for primality until one is found to be prime, which value $\hat{p}$ is taken as the output p of primary factor selector 46.

Referring to FIG. 7, there is shown a block diagram of an exemplary embodiment of tertiary factor selector 53, suitable for choosing a value for r'. A signal representing LEN(r') is applied as input to selector 71 which generates a possible value $\hat{r}'$ for 4' by selecting LEN(r') bits from the random bit stream b. A signal representing the value $\hat{r}'$ thus generated is applied as input to primality tester 72. If primality tester 72 determines that $\hat{r}'$ is prime then this value is taken as the output r' of the tertiary factor selector 53. If primality tester 72 determines that the input signal $\hat{r}'$ is not prime then a signal is applied to selector 71 which causes it to generate new, random values $\hat{r}'$, each of length LEN(r'), which are tested for primality until one is found to be prime, which value $\hat{r}'$ is taken as the output r' of tertiary factor selector 53.

Referring to FIG. 8, there is shown a block diagram of an exemplary embodiment of factor length selector 41, suitable for choosing values for LEN(p), LEN(r), LEN(r'), LEN(s), LEN(s'), LEN(q), LEN(t), LEN(u), LEN(t'), and LEN(u'). As noted in the description of FIG. 4 above, LEN(p) and LEN(q) are chosen to balance the requirements that both p and q be large and that the difference q-p also be large. Similarly, if either r or s is small, p can be factored easily. Choosing LEN(r) to be larger makes LEN(s) smaller because $LEN(p)=LEN(r)+LEN(s)+LEN(k)$, where k will usually be chosen to be approximately 10 bits long to allow an adequate number of choices for k. (Similar restrictions apply to the choice of LEN(t) and LEN(u) relative to LEN(q).)

As an example, if n is 956 bits long, primary factor length selector 81 could choose LEN(p) uniformly between 360 and 470 bits. Because $LEN(q)=LEN(n)-LEN(p)$, primary factor length selector 81 chooses $LEN(q)=LEN(n)-LEN(p)$ uniformly between 486 and 595 bits. Considering the secondary factors related to p, secondary factor length selector 82 chooses LEN(r) uniformly between 140 bits and LEN(p)−140−14 bits, such that LEN(k) would be 14 bits in length, which makes LEN(s) between 140 bits and LEN(p)−140−14 bits. Since the best known methods of factoring which are based on r or s being small take SQRT(r) or SQRT(s) operations, then the restrictions on the length of r and s according to the invention guarantee the number of operations in factoring is very large. For instance, in the example given above, it would take 270=1021 operations to carry out the best known factoring methods. Since the best known methods of factoring which are based on the tertiary factor r' being small require r' operations, tertiary factor length selector 83 chooses LEN(r') uniformly between 70 bits and LEN(r)−14 bits. The same restrictions apply to s' with tertiary factor selector 84. The restriction on the length of r' and s' guarantees that either of these methods also will require at least 2**70 operations.

Similarly, secondary factor length selector 85 is operative to restrict selection of the length LEN(t) uniformly between 140 bits and LEN(q)−140−14 bits, so that $LEN(u)=LEN(q)-LEN(t)-14$ bits is also uniformly distributed between 140 bits and LEN(q)−140−14 bits. Tertiary factor length selector 86 [or 87] chooses LEN(t') [or LEN(u')] uniformly between 70 bits and LEN(t')−14 [or LEN(u')−14] bits. This guarantees that the best known methods of factoring based on t, u, t' or u' being small will require at least 2**70 operations.

The hereinabove-described computational structures incorporate parallel operational elements so that unrelated functions can be carried out independently. These structures can be embodied in dedicated circuitry or in general purpose computational machines preprogrammed to carry out the operations according to the invention. Other embodiments, including those embodiments best carried out in the form of a function of a random access digital computer may implement processes in a different order, or iteratively instead of in parallel.

Methods and apparatus for generating keys have been described, the keys being particularly useful in a public-key digital signature system, such as might be used to authenticate data. A number of different digital signature systems are available to choose from. The RSA and the Rabin system may potentially use a key generator according to the invention. Other public-key generators and other cryptosystems may be used in accordance with the invention. It is therefore not intended that this invention be limited except as indicated by the appended claims.

We claim:

1. For use in connection with an apparatus employing a public key n and a secret key comprising primary factors p and q where n=pq wherein said public key is used for authenticating data, for enciphering data, or for authenticating and enciphering data, and the secret key is used for signing the data, for deciphering the data, or for signing and deciphering the data, apparatus for generating said secret key and said public key such that recovery of said secret key from said public key is computationally infeasible, said apparatus comprising:

means for establishing a length of said public key;
means for establishing lengths of p-related secondary factors, p-related tertiary factors, q-related secondary factors and q-related tertiary factors which are functions of said secret key p and q;
means for choosing a tentative p value as one of said primary factors;
means for choosing a tentative q value as one of said primary factors;
means for testing said tentative p value for suitability as a part of said secret key based on two p-related secondary factors and two p-related tertiary factors, each one of said p-related tertiary factors and said p-related secondary factors being functions of said tentative p value; and
means for testing said tentative q value for suitability as a part of said secret key based on two q-related secondary factors and two q-related tertiary factors, each one of said q-related tertiary factors and said q-related secondary factors being functions of said tentative q value.

2. The apparatus according to claim 1 wherein said p value testing means comprises means for testing for primality of a value of a first said p-related secondary factor which is a factor of a value p+1 and means for testing for primality of a value of a second p-related secondary factors which is a factor of a value p−1.

3. The apparatus according to claim 2 wherein said q value testing means comprises means for testing for primality of a value of a first one of said q-related secondary factors which is a factor of a value q+1 and means for testing for primality of a value of a second one of said q-related secondary factors which is a factor of a value q−1.

4. The apparatus according to claim 1 wherein said q value testing means comprises means for testing for primality of a value of a first one of said q-related secondary factors which is a factor of a value q+1 and means for testing for primality of a value of a second one of said q-related secondary factors which is a factor of a value q−1.

5. The apparatus according to claim 1 wherein said value length establishing means includes means for establishing the length of factors of p+1, and p−1.

6. The apparatus according to claim 4 wherein said value length establishing means includes means for establishing the length of factors of p+1, and p−1.

7. The apparatus according to claim 3 wherein said p value testing means further includes means for testing for primality of said first p-related secondary factor, said first p-related secondary factor being designated as r and being a factor of p+1.

8. The apparatus according to claim 7 wherein said p value testing means further includes means for testing for primality of said second p-related secondary factor, said second p-related secondary factor being designated as s and being a factor of p−1.

9. The apparatus according to claim 8 wherein said q value testing means further includes means for testing for primality of said first q-related secondary factor, said first q-related secondary factor being designated as t and being a factor of q+1.

10. The apparatus according to claim 9 wherein said q value testing means further includes means for testing for primality of said second q-related secondary factor, said second q-related secondary factor being designated as u and being a factor of q−1.

11. The apparatus according to claim 1 wherein said p value testing means further includes means for testing for primality of said first p-related secondary factor, said first p-related secondary factor being designated as r and being a factor of $p+1$.

12. The apparatus according to claim 1 wherein said p value testing means further includes means for testing for primality of said second p-related secondary factor, said second p-related secondary factor being designated as s and being a factor of $p-1$.

13. The apparatus according to claim 12 wherein said value length establishing means includes means for establishing the length of factors of $p+1$, and $p-1$.

14. For use in connection with an apparatus employing a public key n and a secret key comprising primary factors p and q where $n=pq$ wherein said public key is a digital signal used for authenticating, enciphering, or authenticating and enciphering data and the secret key is used for signing, deciphering, or signing and deciphering the data, a method for generating said secret key and said public key such that recovery of said secret key from said public key is computationally infeasible, said method comprising:
 establishing a length of said public key based on a desired security level;
 establishing lengths of p-related secondary factors and p-related tertiary factors, q-related secondary factors and q-related tertiary factors which factors are functions of said secret key p and q;
 choosing a tentative p value as one of said primary factors;
 choosing a tentative q value as one of said primary factors;
 testing said tentative p value for suitability as a part of said secret key based on two p-related secondary factors and two p-related tertiary factors, each one of said p-related tertiary factors and said p-related secondary factors being functions of said tentative p value;
 testing said tentative q value for suitability as a part of secret key based on two q-related secondary factors and two q-related tertiary factors, each one of said q-related tertiary factors and said q-related secondary factors being functions of said tentative q value; and
 presenting said public key and said secret key as digital electronic signals to an output utilization means.

15. The method according to claim 14 wherein said p value testing step comprises testing for primality of a value of a first p-related secondary factor r which is a factor of a value $p+1$ and testing for primality of a value of a second p-related secondary factor s which is a factor of a value $p-1$.

16. The method according to claim 15 wherein said q value testing step comprises testing for primality of a value of a first q-related secondary factor t which is a factor of a value $q+1$ and testing for primality of a value of a second q-related secondary factor u which is a factor of a value $q-1$.

17. The methods according to claim 16 wherein said value length establishing test comprises establishing the length of factors of $p+1$, and $p-1$.

18. The method according to claim 14 wherein said p value testing step further includes testing for primality of said first p-related secondary factor, said first p-related secondary factor being designated as r and being a factor of $p+1$.

19. The method according to claim 18 wherein said p value testing step further includes testing for primality of said first p-related tertiary factor, said first p-related tertiary factor being designated as r' and being a factor of $r-1$.

20. The method according to claim 16 wherein said q value testing step further includes testing for primality of said first q-related secondary factor, said first q-related secondary factor being designated as t and being a factor of $q+1$.

21. The method according to claim 20 wherein said q value testing step further includes testing for primality of said first q-related tertiary factor said first q-related secondary factor being designated as t' and being of a factor of $t-1$.

22. The method according to claim 21 wherein said p value testing step further includes testing for primality of said first p-related tertiary factor, said first p-related tertiary factor being designated r' and being a factor of $r-1$.

23. The method according to claim 22 wherein said p value testing step further includes testing for primality of said second p-related tertiary factor, said second p-related tertiary factor being designated s' and being a factor of $s-1$.

24. The method according to claim 23 wherein said q value testing step further includes testing for primality of said second q-related tertiary factor, said second q-related tertiary factor being designated u' and being a factor of $u-1$.

* * * * *